(12) United States Patent
Sawada et al.

(10) Patent No.: US 7,605,683 B2
(45) Date of Patent: Oct. 20, 2009

(54) MONOLITHIC ELECTRONIC COMPONENT

(75) Inventors: Takashi Sawada, Sabae (JP); Kenjiro Hadano, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/029,613

(22) Filed: Feb. 12, 2008

(65) Prior Publication Data

US 2008/0128860 A1 Jun. 5, 2008

Related U.S. Application Data

(63) Continuation of application No. PCT/JP2006/315640, filed on Aug. 8, 2006.

(30) Foreign Application Priority Data

Sep. 30, 2005 (JP) ............................ 2005-286748

(51) Int. Cl.
*G01L 1/22* (2006.01)
(52) U.S. Cl. ..................... 338/2; 338/307; 257/724; 257/736
(58) Field of Classification Search ......... 338/307–309, 338/2; 257/724, 730, 736, 750
See application file for complete search history.

(56) References Cited

U.S. PATENT DOCUMENTS

2005/0012200 A1  1/2005  Sawada et al.

FOREIGN PATENT DOCUMENTS

| JP | 62-184728 U | 11/1987 |
|---|---|---|
| JP | 05-283283 A | 10/1993 |
| JP | 08-264328 A | 10/1996 |
| JP | 10-303066 A | 11/1998 |
| JP | 11-283866 A | 10/1999 |
| JP | 2000-243662 A | 9/2000 |
| JP | 2002-184606 A | 6/2002 |
| JP | 2004-259735 A | 9/2004 |
| JP | 2004-259736 A | 9/2004 |
| JP | 2004-259820 A | 9/2004 |

OTHER PUBLICATIONS

Official communication issued in the International Application No. PCT/JP2006/315640, mailed on Sep. 19, 2006.
Official communication issued in counterpart Japanese Application No. JP 2005-286748, mailed on Sep. 12, 2006.
Official communication issued in counterpart Chinese Application No. 200680027136.5, mailed on Jan. 9, 2009.

*Primary Examiner*—Kyung Lee
(74) *Attorney, Agent, or Firm*—Keating & Bennett, LLP

(57) ABSTRACT

In a monolithic electronic component in which a resistive element is incorporated by forming a resistor film on a terminal electrode, a plating film can be formed on the terminal electrode having the resistor film via electroplating in an efficient manner and with a uniform film thickness. In order to form the terminal electrode, the resistor film is disposed directly on the surface of the component body, and a conductive resin film having a relatively low volume resistivity is disposed over the resistor film. The conductive resin film is preferably adapted to have a specific resistance of less than about $1 \times 10^{-4}$ Ω·m, on which a plating film having a uniform film thickness can be formed efficiently via electroplating.

13 Claims, 7 Drawing Sheets

MONOLITHIC ELECTRONIC COMPONENT

BACKGROUND OF THE INVENTION

1. Field of the Invention

The present invention relates to monolithic electronic components, and more particularly, to the structure of terminal electrodes disposed on the external surfaces of a component body having a monolithic structure so as to be electrically connected to internal electrodes.

2. Description of the Related Art

In general, the noise of an IC power supply line is removed by connecting a bypass capacitor between the power supply line and the ground. When a printed circuit board that is almost entirely covered with a power supply conductor pattern or a grounding conductor pattern is used in order to achieve high-density mounting, resonance often occurs between the power supply and the ground. Since the occurrence of resonance leads to the occurrence of radiation noise, resonance needs to be suppressed.

However, if a monolithic ceramic capacitor, which typically has an equivalent series resistance (ESR) as small as several milli-ohms and a self-resonance frequency of about 1 MHz to about 100 MHz, is used as a bypass capacitor to control such resonance, the impedance in this frequency band becomes small. Consequently, the resonance described above and occurring within a band of about 1 MHz to about 100 MHz cannot be suppressed.

Generally, it is known that resonance can be suppressed by connecting a resistor in series with a monolithic ceramic capacitor. To enable resonance suppression in such a manner, Japanese Unexamined Utility Model Registration Application Publication No. 62-184728 and Japanese Unexamined Patent Application Publication No. 11-283866, for example, disclose a monolithic ceramic capacitor having a structure where the resistor is connected in series by incorporating the resistor into the terminal electrodes of the monolithic ceramic capacitor itself, not by connecting the resistor as a discrete component to the monolithic ceramic capacitor. In particular, Japanese Unexamined Patent Application Publication No. 11-283866 discloses the formation of a resistor film as a foundation for terminal electrodes by using a resistive paste containing conductive particles and curable resin, and the formation of an electroplating film thereon.

However, when performing electroplating on the resistor film as disclosed in Japanese Unexamined Patent Application Publication No. 11-283866, if the volume resistivity of the resistor film is high, electric current does not easily flow during electroplating, which makes it difficult to perform the electroplating.

Furthermore, even if a plating film can be formed on the resistor film, it is difficult to form the plating film with a uniform thickness. As a result, thinner regions of the plating film easily allow entry of moisture and moisture resistance may be degraded. In addition, since the bonding strength between the resistor film and the plating film is relatively weak when the thickness of the plating film is not uniform, separation of the plating film from the resistor film often occurs when heat is applied during a mounting step or the like, thus leading to changes in resistance.

While the above description relates to monolithic ceramic capacitors, the same problems maybe encountered with other monolithic electronic components having terminal electrodes with resistor films.

SUMMARY OF THE INVENTION

In order to solve the problems described above, preferred embodiments of the present invention provide a monolithic electronic component including a chip component body and a plurality of terminal electrodes disposed on external surfaces of the component body. The component body has a layered structure preferably formed by stacking a plurality of insulator layers and an internal electrode disposed along a certain interface between the insulator layers and extended onto an external surface of the component body so as to be electrically connected to a certain one of the terminal electrodes.

In a preferred embodiment of the present invention, in order to solve the above technical problems, the monolithic electronic component is constructed such that at least one of the terminal electrodes is a resistive terminal electrode including a resistor film having a relatively high volume resistivity and a conductive resin film covering the resistor film and having a volume resistivity that is lower than that of the resistor film.

It is preferable that the resistive terminal electrode further includes a plating film formed on the conductive resin film preferably via electroplating.

When the component body has two opposite major surfaces and side surfaces connecting the major surfaces, it is preferable that the resistor film be formed only over an area of the side surface so as not to extend over the major surface, and that the conductive resin film be formed so as to cover the resistor film on the side surface and so that a portion of the conductive resin film covers a portion of the major surface.

In a first preferred embodiment of the present invention, the resistor film is preferably disposed directly on the surface of the component body and is in contact with the internal electrode. In this case, it is preferable that an end of the internal electrode in contact with the resistor film protrudes from the surface of the component body. When the resistor film has a composition in which carbon particles are dispersed in a thermosetting resin, it is preferable that the internal electrode in contact with the resistor film contains as a conductive component Ni, Ag, Pd, or Au, or an alloy of at least two of Ni, Ag, Pd, and Au.

In a second preferred embodiment of the present invention, the resistive terminal electrode preferably further includes a foundation film disposed under the resistor film, and the foundation film contains a metal sintered body as a conductive component and is in contact with the internal electrode. When the resistor film has a composition in which carbon particles are dispersed in a thermosetting resin in the second preferred embodiment, it is preferable that the foundation film contains as a conductive component Ni, Ag, Pd, or Au, or an alloy of at least two of Ni, Ag, Pd, and Au. It is also preferable that the conductive component of the internal electrode contains the same type of metal as that contained in the conductive component of the foundation film.

In the monolithic electronic component according to a preferred embodiment of the present invention, it is preferable that the specific resistance of the resistor film be approximately $1 \times 10^{-4}$ Ω·m or greater, for example.

It is also preferable that the specific resistance of the conductive resin film be less than about $1 \times 10^{-4}$ Ω·m, for example.

In a preferred embodiment of the present invention, the internal electrode may include at least one pair of a first internal electrode and a second internal electrode opposed to each other with one of the insulator layers disposed therebetween so as to create an electrostatic capacity, and the terminal electrodes may include a first terminal electrode electrically connected to the first internal electrode and a second internal electrode electrically connected to the second internal electrode. In this case, the monolithic electronic component according to this preferred embodiment of the present invention defines a CR composite component.

According to a preferred embodiment of the present invention, since the resistor film of the resistive terminal electrode included in the monolithic electronic component is covered with the conductive resin film having a relatively low volume resistivity, a structure where good electroplating is achieved can be provided to the resistive terminal electrode.

Therefore, when in the resistive terminal electrode a plating film is formed on the conductive resin film preferably via electroplating, the thickness of the plating film can be made uniform. Thus, moisture resistance of the monolithic electronic component can be ensured, and changes in resistance due to heat during, for example, a mounting step can be suppressed. When the plating film has a bi-layer structure including a layer of a metal, such as Ni for example, which is not meltable at the solder melting temperature, and a layer formed thereon and made of a metal, such as Sn for example, having good solder wettability, the sealing property of the resistive terminal electrode against moisture can be ensured and heat resistance during a soldering step can be ensured. Furthermore, a good soldering characteristic can be imparted.

In the case where the component body has two opposite major surfaces and side surfaces connecting the major surfaces, by forming the resistor film only over the area of the side surface so as not to extend over the major surface and forming the conductive resin film so as to cover the resistor film on the side surface and so that the portion of the conductive resin film covers the portion of the major surface, the resistor film can be more isolated from the external environment and moisture resistance can be further improved.

Since in the first preferred embodiment of the present invention, the resistor film is disposed directly on the surface of the component body and contacts with the internal electrode, the first preferred embodiment has superior advantages compared to the second preferred embodiment, where the foundation film is disposed under the resistor film, in the following aspect.

When a foundation film is provided as in the second preferred embodiment, application and baking of a conductive paste is used. In the application of a conductive paste, however, paste application conditions are difficult to control especially at corners, leading to variations in application thickness. Paste application conditions in forming a resistor film are likewise difficult to control at corners, leading to variations in application thickness. Resistance is dominantly determined by the thinnest region of the resistor film provided between the conductive resin film, formed on the resistor film, and the foundation film. When a conductive paste or a resistive paste is applied, the thickness of the paste becomes the smallest and control of paste application conditions is difficult at corners in general. Therefore, resistance is greatly affected by the variation in resistor film thickness at corners.

In the first preferred embodiment, however, the resistor film is formed directly on side surfaces onto which the internal electrode is extended, which makes control of paste application conditions on side surfaces easier and resistance is less affected by the variations in resistor film thickness. Consequently, resistance variations can be suppressed and minimized.

Resistance is also affected by the area of the extending portion of the internal electrode. In this aspect, however, since variations in the area of the extending portion of the internal electrode is small, resistance variations can be reduced. Furthermore, the additional cost of forming a foundation layer is unnecessary.

In the first preferred embodiment of the present invention, when the end of the internal electrode in contact with the resistor film protrudes from the surface of the component body, a highly reliable electrical connection of the internal electrode with the resistor film and consequently with the resistive terminal electrode is achieved, and resistance variations among monolithic electronic components as products can be suppressed and minimized.

In the first preferred embodiment of the invention, when the resistor film has a composition in which carbon particles are dispersed in a thermosetting resin and the internal electrode contains as a conductive component Ni, Ag, Pd, or Au, or an alloy of at least two of Ni, Ag, Pd, and Au, no battery reaction occurs between the resistor film and the internal electrode, and the problem of increased contact resistance on the interface does not arise. Likewise, in the second preferred embodiment of the present invention, when the resistor film has a composition where carbon particles are dispersed in a thermosetting resin and the foundation film contains as a conductive component Ni, Ag, Pd, or Au, or an alloy of at least two of Ni, Ag, Pd, and Au, no battery reaction occurs between the resistor film and the foundation film, and the problem of increased contact resistance on the interface does not arise.

Furthermore, by using a metal such as Ni, Ag, Pd, or Au as a conductive component of the internal electrode or the foundation film as described above, changes in characteristics due to heat applied for curing the individual resin components when forming the resistor film and the conductive resin film can be suppressed.

In the second preferred embodiment of the present invention, when the conductive component of the internal electrode contains the same type of metal as that contained in the conductive component of the foundation film, metal dispersion that would occur with different metals during a baking step for forming the foundation film can be prevented, and thus the resistance can be stabilized.

In various preferred embodiments of the present invention, when the specific resistance of the resistor film is about $1 \times 10^{-4}$ $\Omega \cdot m$ or greater, a resistance that is sufficient for resonance prevention can be assuredly imparted to the resistive terminal electrode.

In various preferred embodiments of the present invention, when the specific resistance of the conductive resin film is less than about $1 \times 10^{-4}$ $\Omega \cdot m$ a preferable plating characteristic can be assuredly imparted to the conductive resin film.

In the case where the monolithic electronic component according to a preferred embodiment of the present invention defines a CR composite component, when the CR composite component is used so as to be provided between a power supply line and a ground, the capacity component of the CR composite component suppresses changes in voltage and the resistance component suppresses resonance. Thus, the power supply voltage can be stabilized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 2A and 2B are sectional plan views showing the internal structure of the three-terminal CR composite component shown in FIG. 1, wherein FIG. 2A shows a cross-section along a plane where a first internal electrode is located; and FIG. 2B shows a cross-section along a plane where a second internal electrode is located.

DETAILED DESCRIPTION OF PREFERRED EMBODIMENTS

Figure 1:
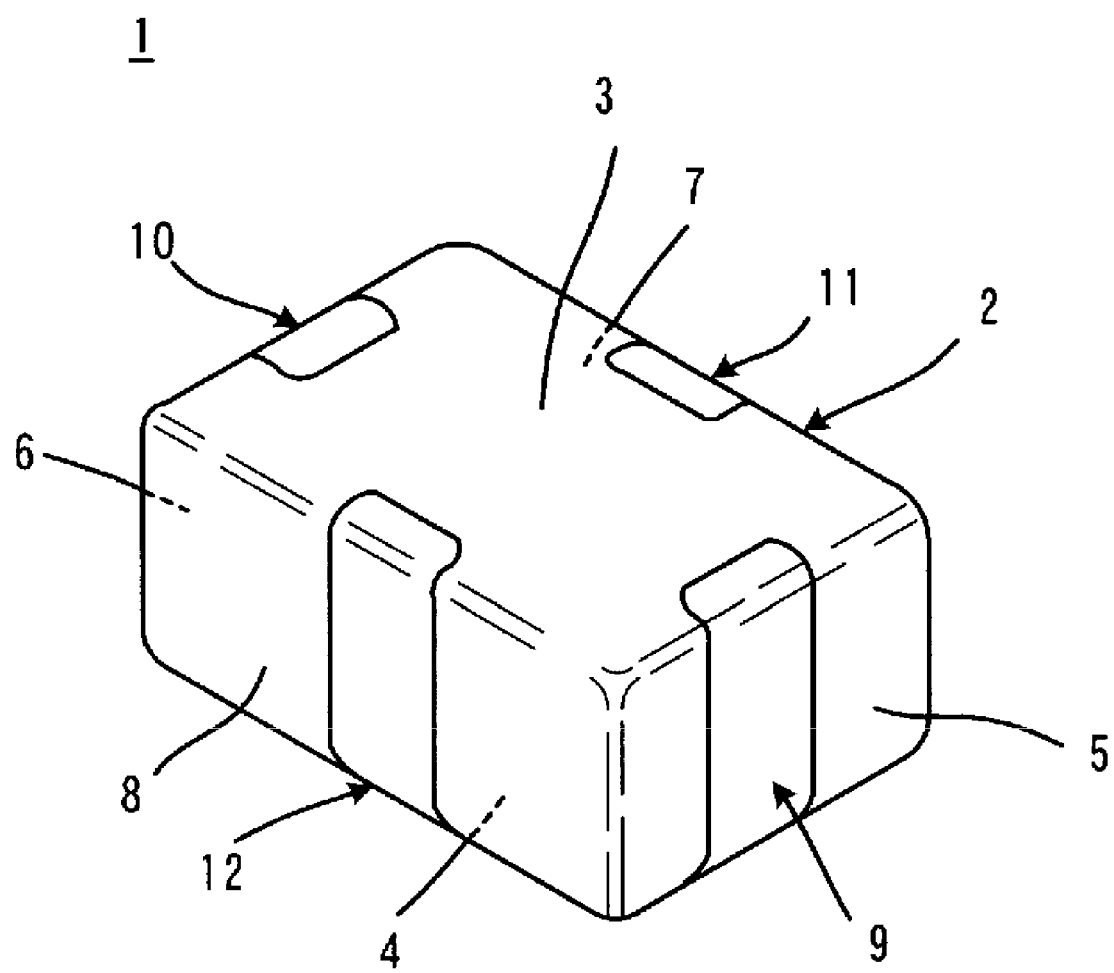
FIG. 1 illustrates a typical structure of a three-terminal CR composite component as one example of a monolithic electronic component according to a preferred embodiment of the present invention, and is an external perspective view showing the three-terminal CR composite component.
Figure 2A:
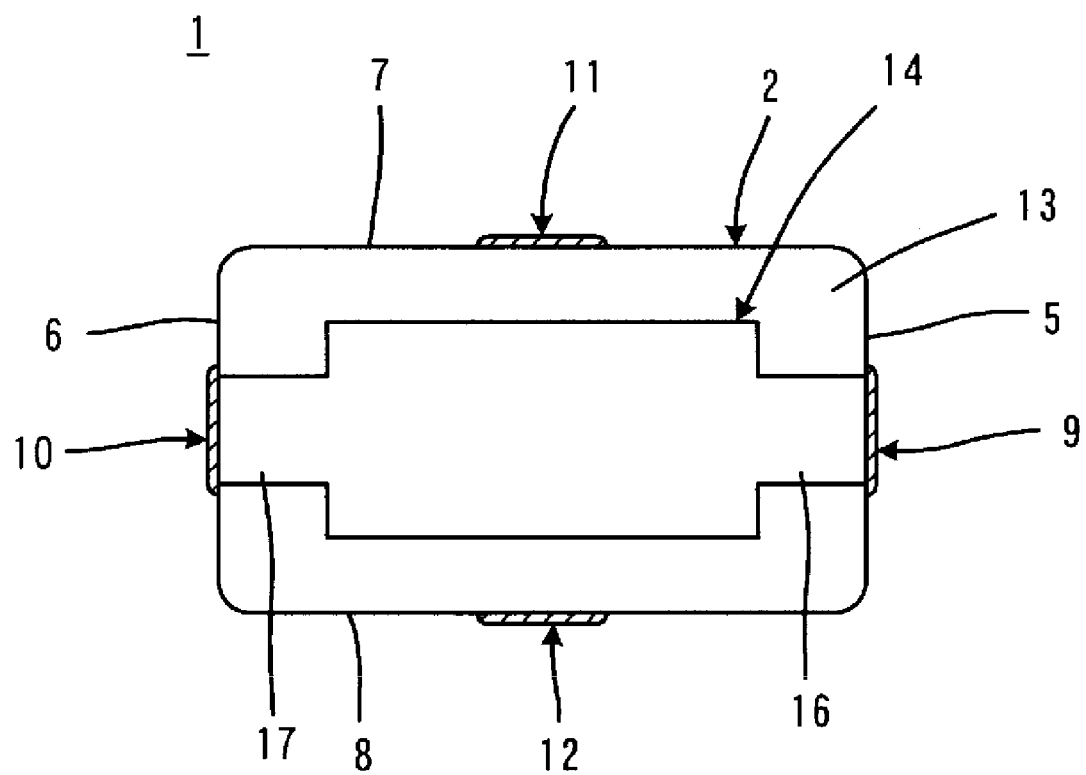
Figure 2B:
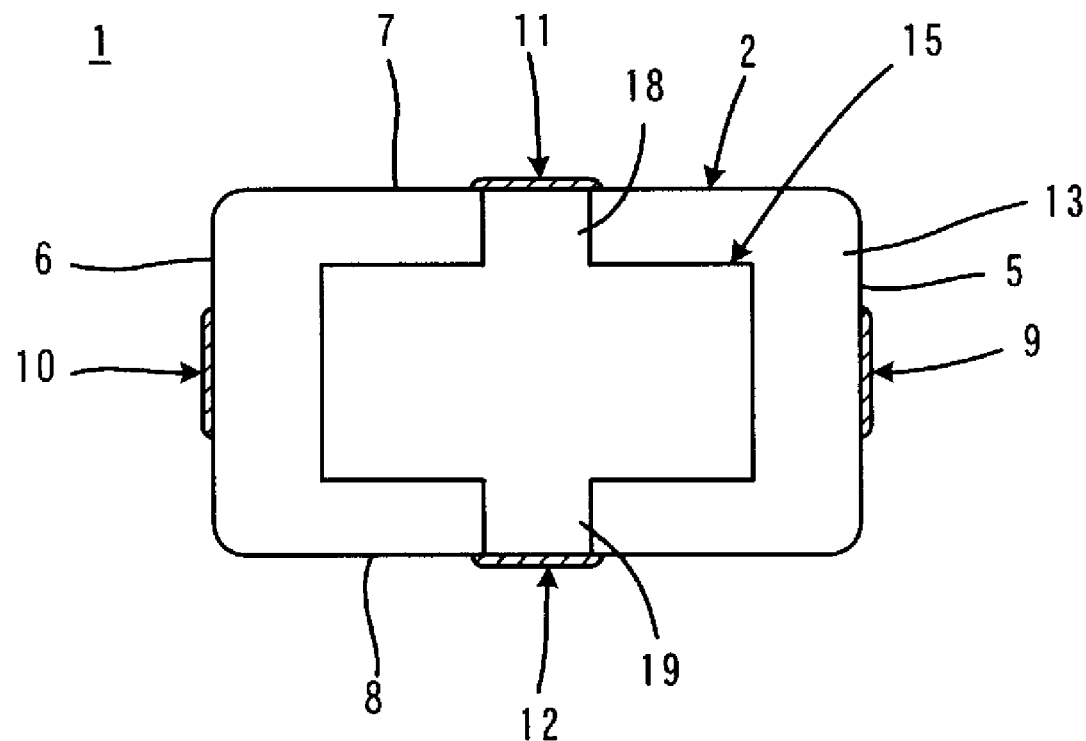

FIG. 1 and FIGS. 2A and 2B illustrate a typical structure of a three-terminal CR composite component 1 as one example of a monolithic electronic component according to a preferred embodiment of the present invention. FIG. 1 is an external perspective view showing the three-terminal CR composite component 1, and FIGS. 2A and 2B are sectional plan views showing the internal structure of the three-terminal CR composite component 1. FIG. 2A and FIG. 2B show different cross-sections.

The three-terminal CR composite component 1 preferably includes a chip component body 2. The component body 2 preferably is a substantially rectangular parallelepiped having two opposite major surfaces 3 and 4, and four side surfaces 5 to 8 connecting the major surfaces 3 and 4. On the external surfaces of the component body 2, two first terminal electrodes 9 and 10 and two second terminal electrodes 11 and 12 are formed.

More specifically, one first terminal electrode 9 is extended as a strip in the approximate center of one side surface 5 on the shorter side of the component body 2 so that portions of the first terminal electrode 9 cover portions of the adjoining major surfaces 3 and 4. The other first terminal electrode 10 is extended as a strip in the approximate center of the side surface 6 opposite the side surface 5 so that portions of the first terminal electrode 10 cover portions of the adjoining major surfaces 3 and 4.

One second terminal electrode 11 is extended as a strip in the approximate center of one side surface 7 on the longer side of the component body 2 so that portions of the second terminal electrode 11 cover portions of the adjoining major surfaces 3 and 4. The other second terminal electrode 12 is extended as a strip in the approximate center of the side surface 8 opposite the side surface 7 so that portions of the second terminal electrode 12 cover portions of the adjoining major surfaces 3 and 4.

As shown in FIGS. 2A and 2B, the component body 2 has a layered structure where a plurality of insulator layers 13 made of ceramic such as, for example, $BaTiO_3$-based dielectric ceramic are stacked. Inside the component body 2, at least one pair of a first internal electrode 14 and a second internal electrode 15 is provided along certain interfaces between the insulator layers 13. The first and second internal electrodes 14 and 15 are alternately stacked and are opposed to each other, thereby creating an electrostatic capacity.

As described above, FIG. 2A and FIG. 2B show different cross-sections. FIG. 2A shows a cross-section along a plane where the first internal electrode 14 is located, and FIG. 2B shows a cross-section along a plane where the second internal electrode 15 is located.

The first internal electrode 14 includes relatively narrow extending portions 16 and 17 that extend to the respective short side surfaces 5 and 6 of the component body 2 so as to be electrically connected to the first terminal electrodes 9 and 10. The second internal electrode 15 includes relatively narrow extending portions 18 and 19 that extend to the respective long side surfaces 7 and 8 of the component body 2 so as to be electrically connected to the second terminal electrodes 11 and 12.

Figure 3:
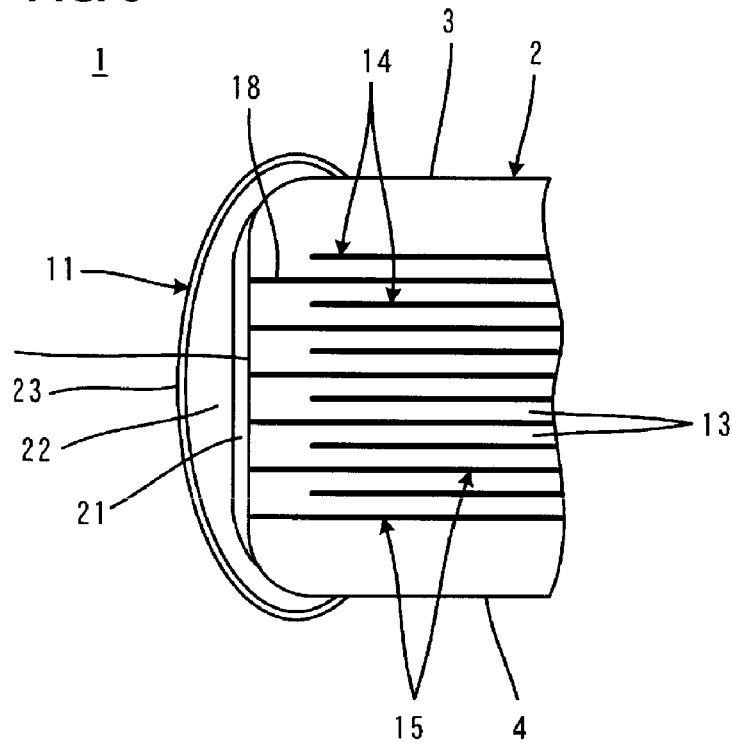
FIG. 3 illustrates a first preferred embodiment of the present invention and is a sectional front view of the major portion of the three-terminal CR composite component shown in FIG. 1 and FIGS. 2A and 2B.
Figure 4:
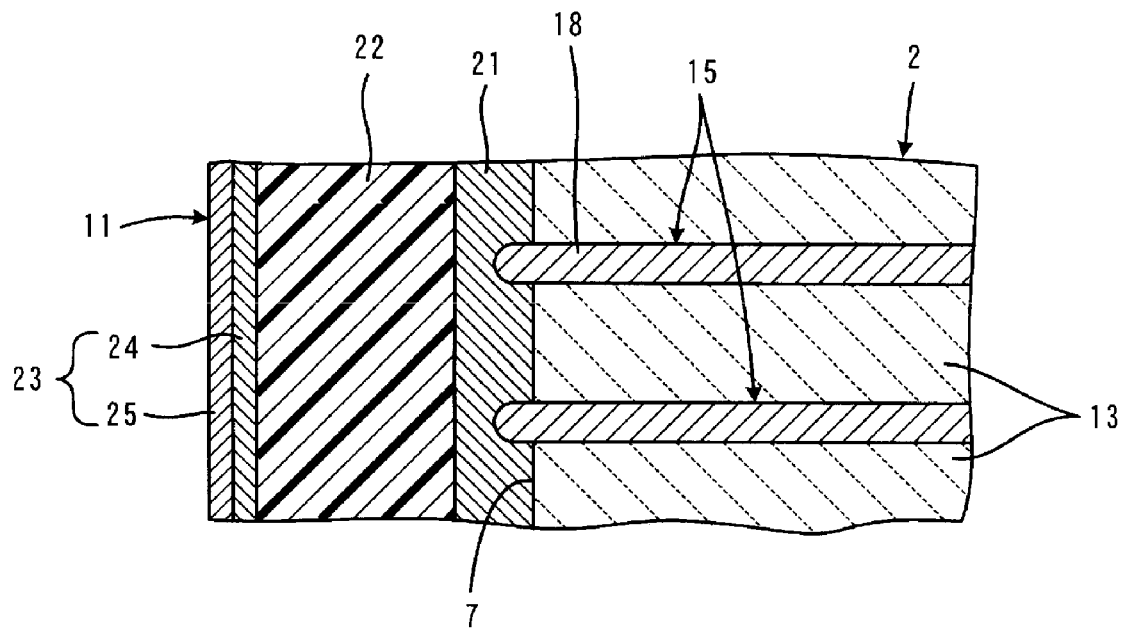
FIG. 4 is an enlarged front view showing a portion of FIG. 3.

In a first preferred embodiment of the present invention, the second terminal electrodes 11 and 12 included in the three-terminal CR composite component 1 are resistive terminal electrodes, and each of the second terminal electrodes 11 and 12 preferably has the structure shown in FIG. 3. FIG. 3 illustrates the first preferred embodiment of the invention and is a sectional front view of the major portion of the three-terminal CR composite component 1 described with reference to FIG. 1 and FIGS. 2A and 2B. FIG. 4 is an enlarged view showing a portion of the major portion of the three-terminal CR composite component 1 shown in FIG. 3. In FIG. 3 and FIG. 4, elements the same as those shown in FIG. 1 and FIG. 2 are denoted by like reference numerals, and redundant descriptions are omitted.

FIG. 3 and FIG. 4 show the one second terminal electrode 11. Although the other second terminal electrode 12 is not shown, the second terminal electrode 12 and an associated structure thereof are substantially the same as the terminal electrode 11 and an associated structure thereof, respectively. Therefore, descriptions hereafter will be made only for the second terminal electrode 11 shown. In this preferred embodiment, the second terminal electrodes 11 and 12 preferably define grounding terminal electrodes, and the first terminal electrodes 9 and 10 preferably define signal terminal electrodes.

Referring to FIG. 3 and FIG. 4, the second terminal electrode 11 includes a resistor film 21, a conductive resin film 22 disposed over the resistor film 21, and a plating film 23 disposed on the conductive resin film 22.

The resistor film 21, which provides a relatively high volume resistivity, has a composition in which, for example, carbon particles are dispersed in a thermosetting resin. The specific resistance of the resistor film 21 is preferably about $1 \times 10^{-4}$ $\Omega \cdot m$ or greater. Thus, a resistance sufficient for resonance prevention can be assuredly provided to the terminal electrode 11. If the specific resistance of the resistor film 21 is less than $1 \times 10^{-4}$ $\Omega \cdot m$, the formation of the conductive resin film 22 thereon becomes less significant.

The resistor film 21 in this preferred embodiment is disposed directly on the side surface 7 of the component body 2 and is in direct contact with the internal electrode 15. When the resistor film 21 contains carbon particles as described above, the internal electrode 15 in contact with the resistor film 21 preferably contains Ni, Ag, Pd, or Au or an alloy of at least two of Ni, Ag, Pd, and Au as a conductive component. Cu is unsuitable. If the internal electrode 15 contains Cu, a problem arises that battery reaction occurs between Cu and carbon and the contact resistance of the interface increases. In contrast, a metal such as Ni, Ag, Pd, or Au does not cause such battery reaction.

Furthermore, a metal such as Ni, Ag, Pd, or Au contained in the internal electrode 15 has an advantage that characteristics thereof do not easily change due to heat applied to cure the resin components during forming the resistor film 20 and the conductive resin film 22.

As shown in FIG. 4, the end of the extending portion 18 of the internal electrode 15 in contact with the resistor film 21 preferably protrudes from the side surface 7 of the component body 2. In this manner, a highly reliable electrical connection of the internal electrode 15 with the resistor film 21 and consequently with the terminal electrode 11 is achieved. The manner in which the end of the internal electrode 15 is made to protrude from the side surface 7 of the component body 2 will be clarified in a description of a fabrication method provided below.

As shown in FIG. 3, the resistor film 21 is preferably disposed only over the area of the side surface 7 so as not to extend over the major surfaces 3 and 4. The conductive resin film 22 is then arranged so as to cover the resistor film 21 on the side surface 7 and so that portions of the conductive resin film 22 cover portions of the major surfaces 3 and 4. In this manner, the resistor film 21 can be more isolated from the external environment, and moisture resistance of not only the terminal electrode 11 but also the three-terminal CR composite component 1 can be further improved.

The conductive resin film 22 has a volume resistivity lower than that of the resistor film 21. Preferably, the specific resistance of the conductive resin film 22 is less than about $1 \times 10^{-4}$ $\Omega \cdot m$, for example. Thus, when the plating film 23 is formed on the surface of the conductive resin film 22 preferably via electroplating, a preferable plating characteristic can be attained. The conductive resin film 22 is preferably composed of conductive resin which includes, for example, a thermosetting resin such as epoxy resin having conductive metal powder such as Ag powder dispersed therein.

The plating film 23 is formed on the conductive resin film 22 preferably via electroplating. Since the resistor film 21 is covered with the conductive resin film 22 having a relatively low volume resistivity as described above, an electroplating step for forming the plating film 23 can be performed under preferable conditions. More specifically, the plating film 23 with a uniform thickness can be formed efficiently.

In this preferred embodiment, the plating film 23 has a bi-layer structure including a Ni layer 24 and a Sn layer 25 formed thereon, as shown in FIG. 4. The Ni layer 24 is provided and arranged to prevent melting at the solder melting temperature, and the Sn layer 25 is provided and arranged to impart preferable solder wettability. By giving the plating film 23 a bi-layer structure including the Ni layer 24 and the Sn layer 25, sealing property against moisture and heat resistance during a soldering step, and a good soldering characteristic can be imparted to the terminal electrode 11.

Alternatively, Ni composing the Ni layer 24 and Sn composing the Sn layer 25 may be substituted by other metals having similar characteristics.

A method of fabricating the three-terminal CR composite component 1 according to an example of preferred embodiments of the present invention will now be described.

First, ceramic green sheets which are to become the insulator layers 13 are prepared. The internal electrodes 14 and 15 are then formed on certain ceramic green sheets by using a conductive paste. Subsequently, the ceramic green sheets are stacked one on top of another, are pressure-bonded to each other, and are cut according to need. A baking step is then performed, whereby a sintered component body 2 is obtained.

Next, the first terminal electrodes 9 and 10 are formed by applying a conductive paste containing, for example, Cu as a conductive component onto the short side surfaces 5 and 6 of the component body 2 and baking the applied paste.

Then, sandblasting is performed on the long side surfaces 7 and 8 of the component body 2. For example, blast particles are sprayed against the side surfaces 7 and 8 at a pressure of about 0.3 MPa. In this case, there is no possibility that the previously formed first terminal electrodes 9 and 10 are undesirably abraded because a holder for holding the component body 2 covers the side surfaces 5 and 6. In this sandblasting process, since the ceramics composing the insulator layers 13 is abraded more easily than the internal electrode 15, the ends of the internal electrode 15 protrude from the respective side surfaces 7 and 8 of the component body 2, as shown in FIG. 4. Although FIG. 4 does not show the side surface 8 of the component body 2, the same state as the shown side surface 7 is obtained on the side surface 8.

Next, in order to form the second terminal electrodes 11 and 12 on the respective side surfaces 7 and 8 of the component body 2, the resistor film 21 is formed. The resistor film 21 is formed by applying a paste containing carbon particles dispersed in a thermosetting resin such as phenol resin or epoxy resin, and heating the paste at a temperature of about 240° C. to about 310° C. for approximately 5 to 20 minutes to cure the paste.

Subsequently, the conductive resin film 22 is formed so as to cover the resistor film 21. The conductive resin film is formed by applying a conductive paste, which contains, for example, Ag powder dispersed in a thermosetting resin such as epoxy resin, over the resistor film 21, and heating the conductive paste at a temperature of about 180° C. to about 310° C. for approximately 5 to 20 minutes to cure the conductive paste. Note that the thickness of the conductive resin film 22 adjusted such that the thickness is about 10 μm to about 60 μm after drying.

Next, electroplating is performed in order to form the plating film 23 on the conductive resin film 22. More specifically, the Ni layer 24 with a thickness of, for example, about 0.7 μm to 8.0 μm is formed on the conductive resin film 22, and then the Sn layer 25 with a thickness of about 1.5 μm to about 8.0 μm is formed thereon. Such a plating film is also formed on the first terminal electrodes 9 and 10.

Figure 5:
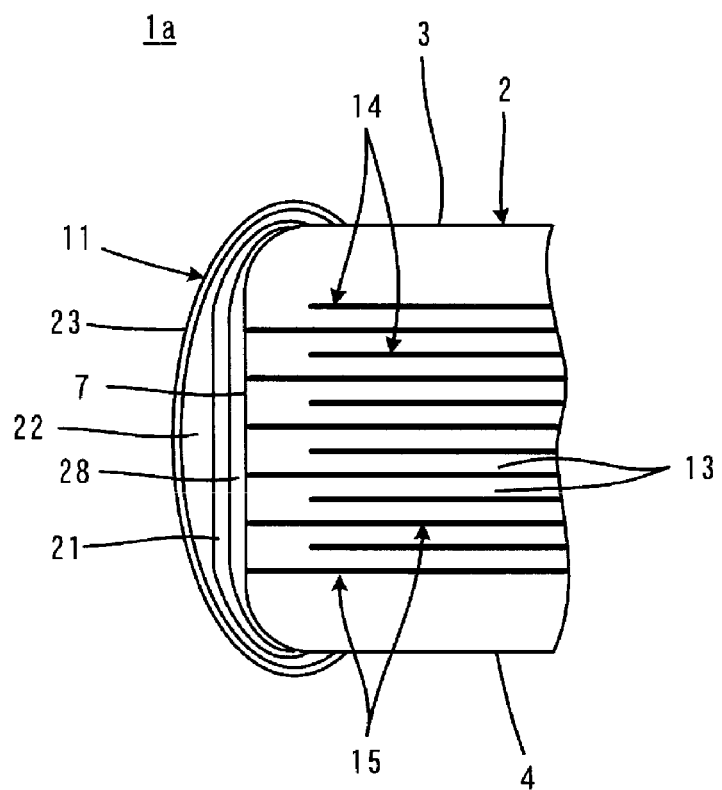
FIG. 5 is a diagram corresponding to FIG. 3 for illustrating a second preferred embodiment of the present invention.

FIG. 5 is a diagram for illustrating a second preferred embodiment of the present invention and corresponding to FIG. 3. In FIG. 5, elements substantially the same as those shown in FIG. 3 are denoted by like reference numerals, and redundant descriptions are omitted.

A three-terminal CR composite component 1a according to the second preferred embodiment is preferably constructed such that the second terminal electrodes 11 and 12 as resistive terminal electrodes further include a foundation film 28 disposed under the resistor film 21. As in FIG. 3, FIG. 5 only shows the configuration of the one second terminal electrode 11, and the configuration of the other second terminal electrode 12 is not shown. However, since the configurations of the second terminal electrode 11 and the second terminal electrode 12 are substantially the same, descriptions hereafter will be made only for the shown second terminal electrode 11.

The foundation film 28 contains a metal sintered body as a conductive component and is in contact with the second internal electrode 15. Similar to the first preferred embodiment, one end of the second internal electrode 15 in the second preferred embodiment preferably protrudes from the side surface 7.

When the resistor film 21 includes carbon particles as described above, the foundation film 28 preferably contains as a conductive component Ni, Ag, Pd, or Au, or an alloy of two or more of Ni, Ag, Pd, and Au. This is because such a configuration causes no battery reaction between the resistor film 21 and the foundation film 28 and the contact resistance of the interface can be prevented from increasing. Such metals also have an advantage that no substantial changes in characteristics occur even when heat is applied in, for example, the steps for forming the resistor film 21 and the conductive resin film 22.

Furthermore, the same type of metal as that contained in the conductive component of the foundation film 28 is preferably contained as a conductive component of the internal electrode 15. This can prevent metal dispersion that would occur with different metals during a baking step for forming the foundation film 28, and can thus stabilize the resistance.

The foundation film 28 is formed by, for example, applying a conductive paste containing the above-described metal on the side surfaces 7 and 8 of the component body 2 and sintering the conductive paste simultaneously in a baking step for sintering the component body 2. If the surface of the foundation film 28 is oxidized in this case, the oxidized film can be removed via sandblasting or the like.

As an alternative to the above method, the foundation film 28 may also be formed by, for example, applying a conductive paste containing Cu, baking the paste, performing electroplating, and forming a Ni film thereon.

Figure 6:
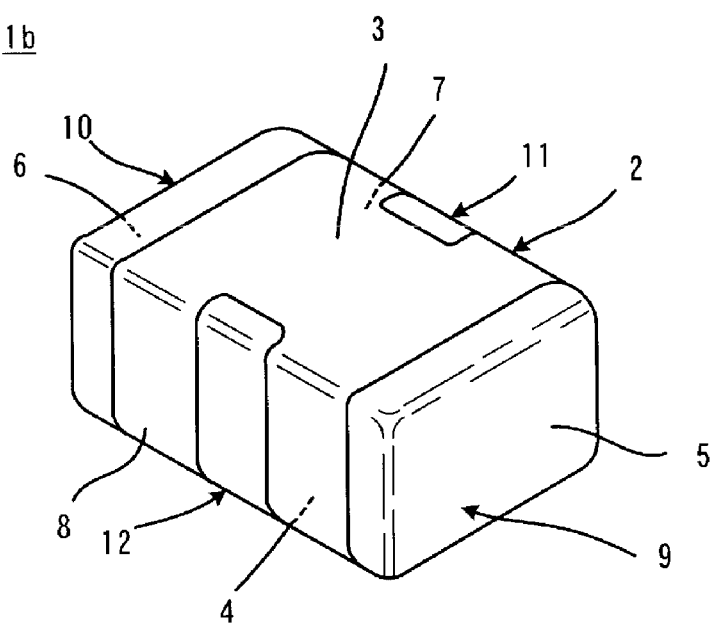
FIG. 6 is a diagram corresponding to FIG. 1 for illustrating a third preferred embodiment of the present invention.
Figure 7A:
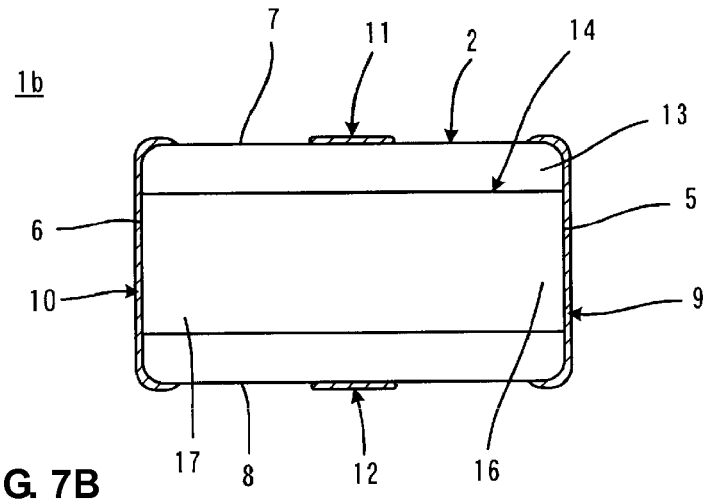
FIGS. 7A and 7B are diagrams corresponding to FIGS. 2A and 2B concerning a three-terminal CR composite component shown in FIG. 6.
Figure 7B:
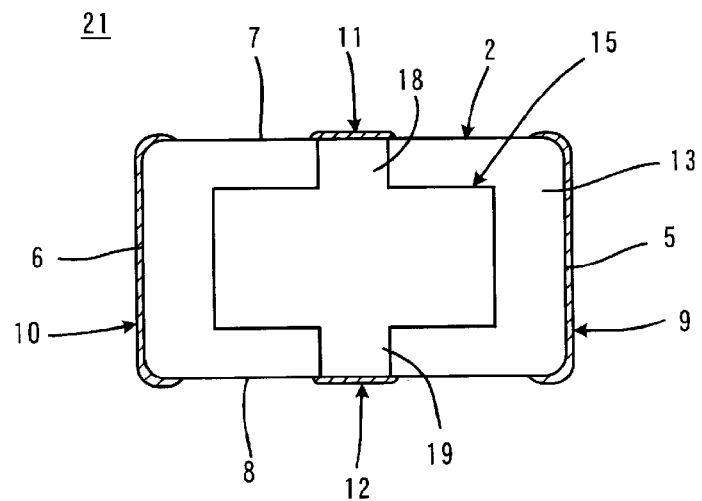

FIG. 6 and FIGS. 7A and 7B are diagrams for illustrating a third preferred embodiment of the present invention and respectively corresponding to FIG. 1 and FIGS. 2A and 2B. In FIG. 6 and FIGS. 7A and 7B, elements that are substantially the same as those shown in FIG. 1 and FIGS. 2A and 2B are denoted by like reference numerals, and redundant descriptions are omitted.

A three-terminal CR composite component 1b according to the third preferred embodiment differs from the three-terminal CR composite component 1 according to the first preferred embodiment in the formation of the first terminal electrodes 9 and 10. More specifically, the one first terminal electrode 9 is formed so as to extend over the entire surface of the one short side surface 5 of the component body 2, and so that portions of the one first terminal electrode 9 cover portions of the major surfaces 3 and 4 and the side surfaces 7 and 8, all adjoining the side surface 5. The other first terminal electrode 10 is formed so as to extend over the entire surface of the other short side surface 6 of the component body 2, and so that portions of the other first terminal electrode 10 cover portions of the major surfaces 3 and 4 and the side surfaces 7 and 8, all adjoining the side surface 6.

The three-terminal CR composite component 1b according to the third preferred embodiment differs from the three-terminal CR composite component 1 according to the first preferred embodiment also in the pattern of the first internal electrode 14. That is, as shown in FIG. 7A, the first internal electrode 14 preferably has a uniform width including the extending portions 16 and 17 and extended onto the side surfaces 5 and 6 of the component body 2 so as to be electrically connected to the first terminal electrodes 9 and 10.

While the second terminal electrodes 11 and 12 preferably define resistive terminal electrodes having the resistor film 21 in the first and second preferred embodiments, it is preferable in the third preferred embodiment that the first terminal electrodes 9 and 10 define resistive terminal electrodes. This is because sandblasting for making the ends of the internal electrodes, which are arranged so as to be electrically coupled to the resistive terminal electrodes, protrude from the surfaces of the component body is performed more simply when performed on the side surfaces 5 and 6. It is simple to first form the second terminal electrodes 11 and 12 and then perform sandblasting on the side surfaces 5 and 6. However, in order to perform sandblasting on the side surfaces 7 and 8 after forming the first terminal electrodes 9 and 10 in a manner shown in FIG. 6 and FIG. 7, the portions of the first terminal electrodes 9 and 10 formed over the side surfaces 7 and 8 are undesirably abraded unless a special mask or the like is used.

In the first to third preferred embodiments, regardless of taking the above matter into consideration, resistive terminal electrodes may be used as either the first terminal electrodes 9 and 10 or the second terminal electrodes 11 and 12. Another configuration may also be used in which either of the first terminal electrodes 9 or 10, or either of the second terminal electrodes 11 or 12 serves as a resistive terminal electrode.

While the above description concerns the cases where preferred embodiments of the present invention are preferably applied to the three-terminal CR composite components 1, 1a, and 1b shown in FIG. 1 to FIG. 7B, the present invention can also be applied to normal two-terminal monolithic ceramic capacitors, as well as to monolithic electronic components having a function other than that of a capacitor. Furthermore, the present invention can be applied not only to ceramic electronic components but also to non-ceramic monolithic electronic components.

Experimental examples implemented in order to verify the advantages of the present invention or to derive more preferable conditions for the present invention will now be described.

EXPERIMENTAL EXAMPLE 1

In Experimental Example 1, the adhesion characteristic of a Ni plating film was evaluated by forming on a ceramic element an approximately 30-μm thick resistive foundation film having a specific resistance shown in Table 1 and performing Ni electroplating via barrel plating at a current Dk value of about 0.20 A/dm² for approximately 60 minutes. The plating film entirely covering the resistive foundation film without exposing any portion of the resistive foundation film was determined to have good plating adhesion. Table 1 shows the number of samples determined to have poor plating adhesion out of a total of 100 samples.

TABLE 1

| Sample number | Specific resistance [$\Omega \cdot m$] | Poor plating adhesion [number of samples] |
|---|---|---|
| 1 | $5 \times 10^{-4}$ | 13/100 |
| 2 | $3 \times 10^{-4}$ | 9/100 |
| 3 | $1 \times 10^{-4}$ | 7/100 |
| 4 | $7 \times 10^{-5}$ | 0/100 |
| 5 | $3 \times 10^{-5}$ | 0/100 |

As seen in Table 1, poor plating adhesion occurred in Samples 1 to 3 where the specific resistance of the resistive foundation film was about $1 \times 10^{-4}$ $\Omega \cdot m$ or greater. Therefore, it is understood that the specific resistance of a conductive resin film is preferably less than $1\times10^{-4}$ Ω·m.

EXPERIMENTAL EXAMPLE 2

In Experimental Example 2, Embodiment Example with conductive resin films and Comparative Example without a conductive resin film were compared in terms of plating film adhesion.

In both Embodiment Example and Comparative Example, the three-terminal CR composite component 1b having the structure shown in FIG. 6 and FIGS. 7A and 7B was used as samples. The dimensions of the component body 2 were approximately 2.0 mm×1.25 mm×0.85 mm. The first terminal electrodes 9 and 10 served as resistive terminal electrodes, on which a resistor film was formed with a specific resistance of about $5\times10^{-3}$ Ω·m and a thickness of about 30 μm.

The three-terminal CR composite component 1b used in Embodiment Example had a conductive resin film having a specific resistance of $3\times10^{-5}$ Ω·m formed on the resistor film.

The samples used in Embodiment Example and Comparative Example were subjected to Ni electroplating for approximately 70 minutes via barrel plating at current Dk values of approximately 0.19 A/dm$^2$, 0.31 A/dm$^2$, 0.43 A/dm$^2$, 0.55 A/dm$^2$, and 0.63 A/dm$^2$. Further, the plating adhesion characteristic on the first terminal electrodes 9 and 10 serving as resistive terminal electrodes was evaluated according to the same criteria as in Experimental Example 1, and the proportion of samples having good plating adhesion out of a total of 30 samples was calculated as a non-defective plating percentage. The results are shown in FIG. 8.

Figure 8:
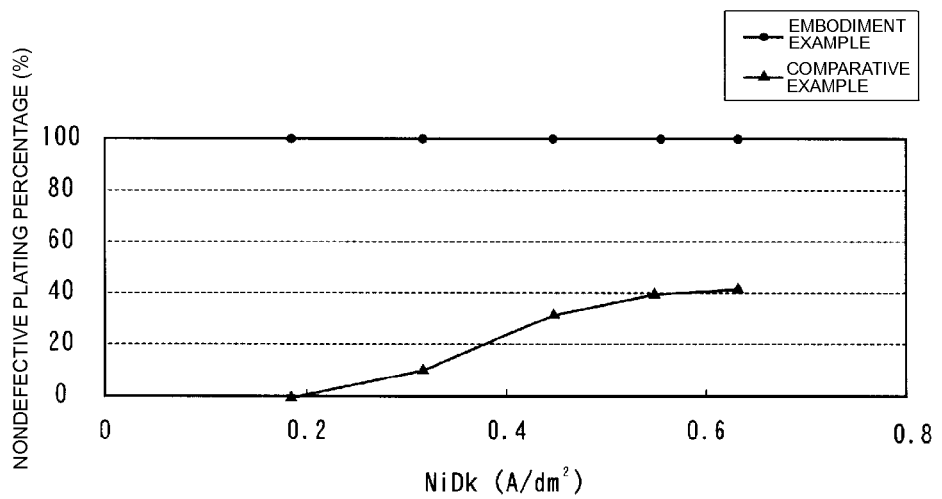
FIG. 8 is a diagram showing data concerning plating adhesion obtained in Experimental Example 2.

As shown in FIG. 8, in Embodiment Example, the non-defective plating percentage was 100% at all of the current Dk values. In contrast, in Comparative Example, the non-defective plating percentage never exceeded 50%, although the non-defective plating percentage increased with increasing current Dk value.

EXPERIMENTAL EXAMPLE 3

In Experimental Example 3, Embodiment Example with conductive resin films and Comparative Example without a conductive resin film were compared in terms of uniformity of plating film thickness.

In Experimental Example 3, the same samples as those in Experimental Example 2 were used as samples of Embodiment Example and Comparative Example, and electroplating was conducted under the same conditions as those in Experimental Example 2 except that the current Dk value was set to about 0.28 A/dm$^2$ in Embodiment Example and except that the current Dk value was set to about 0.43 A/dm$^2$ in Comparative Example. Then, a cross-section of the resultant Ni plating film was polished, and the thickness of the Ni plating film was measured with a digital microscope (1000× magnification). In Comparative Example, where no Ni plating film was formed on some samples, the average thickness and standard deviation of the thickness of the Ni plating film were calculated for 18 samples on which a Ni plating film was formed. The results are shown in Table 2.

TABLE 2

|  | Embodiment Example | Comparative Example |
| --- | --- | --- |
| Average | 2.6 | 3.4 |
| Standard deviation | 0.3 | 2.4 |

As shown in Table 2, the variation among Ni plating layers was considerably smaller in Embodiment Example than in Comparative Example. Note that the average thickness of Ni plating films in Comparative Example was larger than that in Embodiment Example. This is because the thickness measurement was performed only for the samples having the plating film and the region where the plating film had been formed.

EXPERIMENTAL EXAMPLE 4

In Experimental Example 4, Embodiment Example with conductive resin films and Comparative Example without a conductive resin film were compared in terms of moisture resistance.

In Experimental Example 4, samples used were under the same conditions as those for the samples used in Embodiment Example and Comparative Example in Experimental Example 3, except that the specific resistance of the resistor film was about $3\times10^{-3}$ Ω·m.

In the moisture resistance test, steam aging was performed where the samples were left in an atmosphere having a relative humidity of 100% for about four hours, and changes in resistance from before and after the steam aging were calculated. In measuring, the ESR of the three-terminal CR composite component of each sample was measured under the conditions of about 1 MHz and about 1 Vrms. In this case, the ESR was measured for each of the two terminal electrodes having the resistor film. The number of samples measured was 10 each for Embodiment Example and Comparative Example.

Figure 9A:
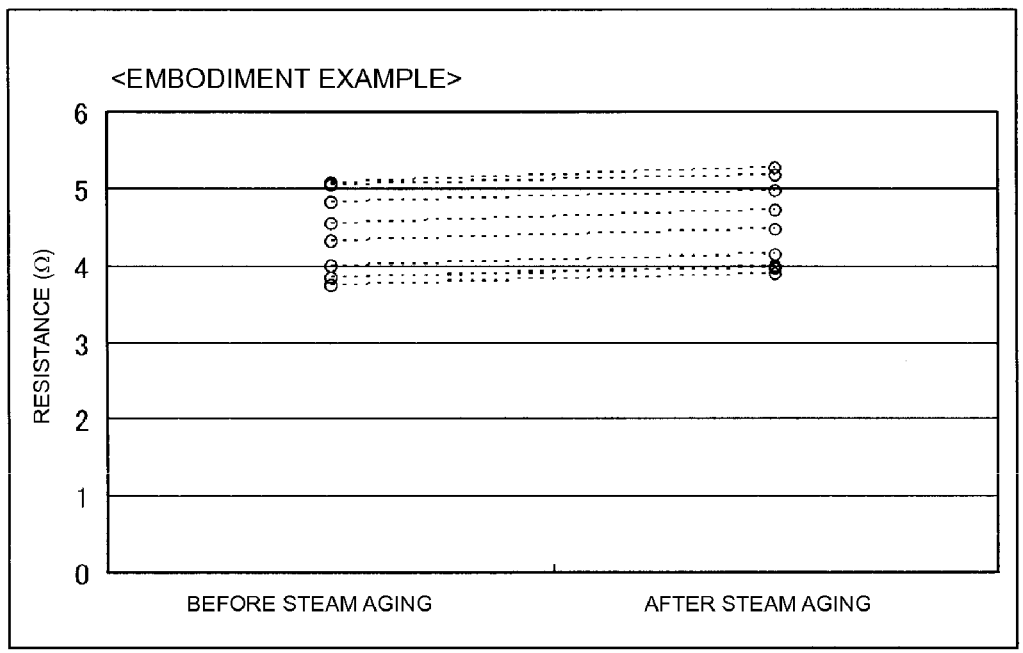
FIGS. 9A and 9B are diagrams showing data concerning moisture resistance obtained in Experimental Example 4.
Figure 9B:
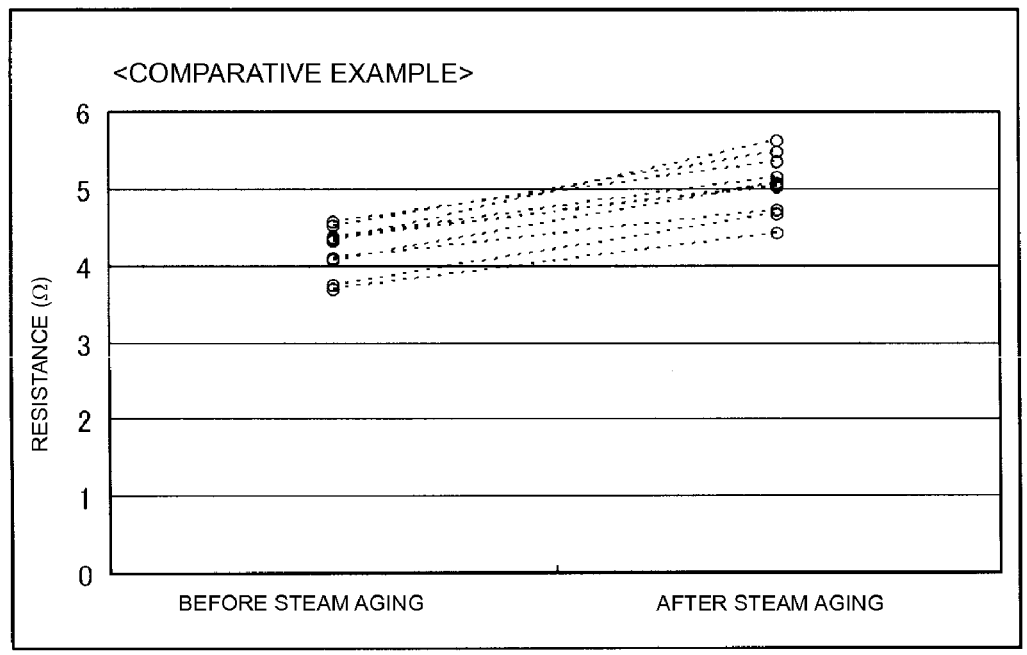

FIG. 9A shows the resistance of the samples of Embodiment Example before and after the steam aging, and FIG. 9B shows the resistance of the samples of Comparative Example before and after the steam aging.

Comparative Example showed a relatively large change in resistance from before to after the steam aging as shown in FIG. 9B, whereas Embodiment Example showed only a slight change in resistance from before to after the steam aging as shown in FIG. 9A. This shows that the three-terminal CR composite component used in Embodiment Example had excellent moisture resistance.

EXPERIMENTAL EXAMPLE 5

In Experimental Example 5, Embodiment Example with conductive films and Comparative Example without a conductive film were compared in terms of heat resistance at the solder melting temperature.

In Experimental Example 5, samples used were the same as those used in Embodiment Example and Comparative Example in Experimental Example 4.

In order to evaluate heat resistance, the samples of Embodiment Example and Comparative Example were immersed in a molten solder bath at a temperature of about 270° C. for approximately 10 seconds, and the resistance was measured before and after the immersion. Conditions for the resistance measurement were the same as those in Experimental Example 4. The number of samples measured was 18 in both Embodiment Example and Comparative Example.

Figure 10A:
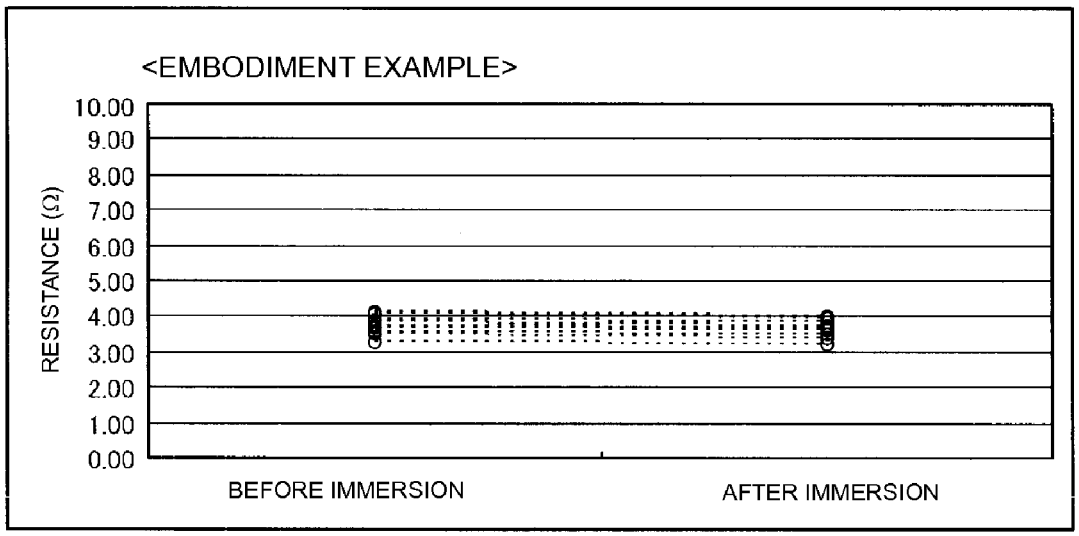
FIGS. 10A and 10B are diagrams showing data concerning heat resistance at the solder melting temperature obtained in Experimental Example 5.
Figure 10B:
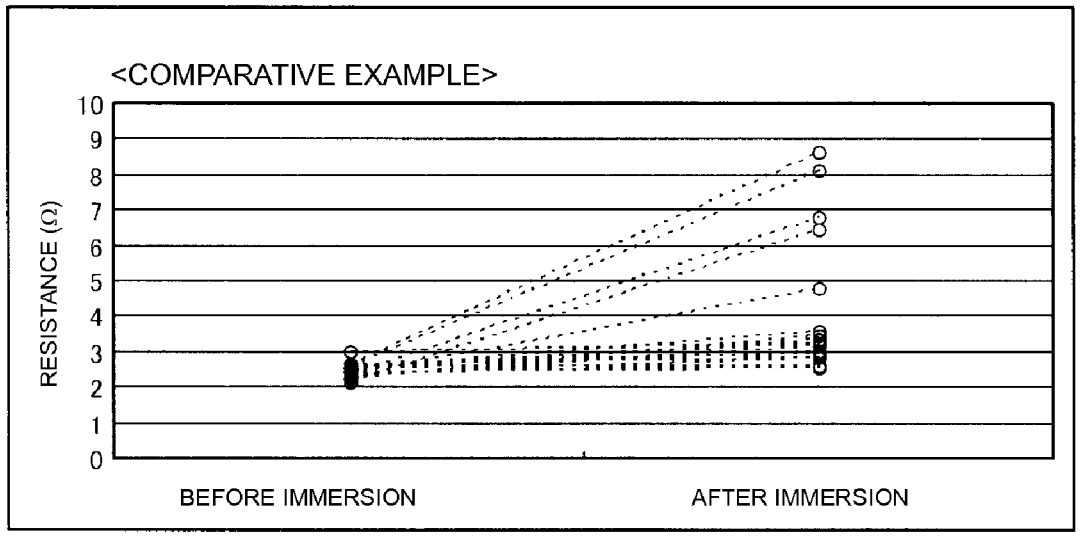

FIG. 10A shows the resistance in Embodiment Example before and after the immersion into molten solder, and FIG. 10B shows the resistance in Comparative Example before and after the immersion in molten solder.

Comparative Example showed a relatively large change in resistance from before to after the immersion in molten solder as shown in FIG. 10B, whereas Embodiment Example showed almost no change in resistance from before to after the immersion in molten solder as shown in FIG. 1A. This shows that the three-terminal CR composite component used in Embodiment Example had excellent heat resistance.

EXPERIMENTAL EXAMPLE 6

Experimental Example 6 was performed so as to verify the effect of sandblasting for making ends of the internal electrode protrude.

Whereas sandblasted samples had been used in Embodiment Example in Experimental Example 3, the same sandblasted samples and non-sandblasted samples fabricated under the same conditions except for sandblasting were prepared. Electrostatic capacity and ESR were measured for each of the sandblasted samples and the non-sandblasted samples. Electrostatic capacity was measured under the conditions of about 1 kHz and about 1 Vrms, and ESR was measured under the conditions of about 1 MHz and about 1 Vrms. The average and standard deviation of a total of 30 samples were calculated for both electrostatic capacity and ESR. The results are shown in Table 3.

TABLE 3

|  | Electrostatic capacity [nF] | | ESR [Ω] | |
| --- | --- | --- | --- | --- |
|  | Average | Standard deviation | Average | Standard deviation |
| Sandblasted | 96.2 | 2.1 | 9.9 | 0.4 |
| Non-sandblasted | 7.4 | 8.8 | 500.5 | 418.1 |

Table 3 clearly shows the effects of sandblasting. That is, focusing on electrostatic capacity, the non-sandblasted samples showed an insufficient electrostatic capacity and a large deviation. Focusing then on ESR, the non-sandblasted samples showed an extremely high ESR and an extremely large deviation. In contrast, the sandblasted samples showed a sufficient electrostatic capacity and a low ESR, and deviations thereof were small.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic electronic component comprising:
a chip component body; and
a plurality of terminal electrodes disposed on external surfaces of the component body; wherein
the component body has a layered structure including a plurality of insulator layers and an internal electrode provided along a certain interface between the insulator layers and extended onto an external surface of the component body so as to be electrically connected to a certain one of the terminal electrodes; and
at least one of the terminal electrodes is a resistive terminal electrode including a resistor film having a composition in which carbon particles are dispersed in a thermosetting resin and a conductive resin film directly covering the resistor film and having a volume resistivity lower than that of the resistor film.

2. The monolithic electronic component according to claim 1, wherein the resistive terminal electrode further includes a plating film disposed on the conductive resin film and made of electroplated material.

3. The monolithic electronic component according to claim 1, wherein the component body has two opposite major surfaces and side surfaces connecting the major surfaces, the resistor film is disposed only over an area of the side surface so as not to extend over the major surface, and the conductive resin film is arranged so as to cover the resistor film on the side surface and so that a portion of the conductive resin film covers a portion of the major surface.

4. The monolithic electronic component according to claim 1, wherein the resistor film is disposed directly on a surface of the component body and is in contact with the internal electrode.

5. The monolithic electronic component according to claim 4, wherein an end of the internal electrode in contact with the resistor film protrudes from the surface of the component body.

6. The monolithic electronic component according to claim 4, wherein the resistor film has a composition in which carbon particles are dispersed in a thermosetting resin, and the internal electrode in contact with the resistor film contains as a conductive component Ni, Ag, Pd, or Au, or an alloy of at least two of Ni, Ag, Pd, and Au.

7. The monolithic electronic component according to claim 1, wherein the resistive terminal electrode further includes a foundation film disposed under the resistor film, and the foundation film contains a metal sintered body as a conductive component and is in contact with the internal electrode.

8. The monolithic electronic component according to claim 7, wherein the resistor film has a composition in which carbon particles are dispersed in a thermosetting resin, and the foundation film contains as a conductive component Ni, Ag, Pd, or Au, or an alloy of at least two of Ni, Ag, Pd, and Au.

9. The monolithic electronic component according to claim 7, wherein the conductive component of the internal electrode contains the same type of metal as that contained in the conductive component of the foundation film.

10. The monolithic electronic component according to claim 1, wherein a specific resistance of the resistor film is about $1 \times 10^{-4}$ Ω·m or greater.

11. The monolithic electronic component according to claim 1, wherein a specific resistance of the conductive resin film is less than about $1 \times 10^{-4}$ Ω·m.

12. The monolithic electronic component according to claim 1, wherein the internal electrode includes at least one pair of a first internal electrode and a second internal electrode opposed to each other with one of the insulator layers disposed therebetween so as to create an electrostatic capacity, and the terminal electrodes include a first terminal electrode electrically connected to the first internal electrode and a second terminal electrode electrically connected to the second internal electrode, so that a CR composite component is provided.

13. A monolithic electronic component comprising:
a chip component body; and
a plurality of terminal electrodes disposed on external surfaces of the component body; wherein
the component body has a layered structure including a plurality of insulator layers and an internal electrode provided along a certain interface between the insulator layers and extended onto an external surface of the component body so as to be electrically connected to a certain one of the terminal electrodes; and at least one of the terminal electrodes is a resistive terminal electrode including a resistor film having a composition in which conductive particles are dispersed in a thermosetting resin, a conductive resin film directly covering the resistor film and having a volume resistivity lower than that of the resistor film, and a plating film directly covering the conductive resin film.

* * * * *